US009811249B2

(12) United States Patent
Chen et al.

(10) Patent No.: US 9,811,249 B2
(45) Date of Patent: Nov. 7, 2017

(54) GENERATING AN OPERATIONAL USER INTERFACE FOR A BUILDING MANAGEMENT SYSTEM

(75) Inventors: Henry Chen, Morristown, NJ (US); Jian Geng Du, Morristown, NJ (US); Hao Bai, Morristown, NJ (US); Tom Plocher, Morristown, NJ (US); Liana M. Kiff, Morristown, NJ (US); Conrad B. Beaulieu, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 327 days.

(21) Appl. No.: 14/379,419

(22) PCT Filed: Feb. 24, 2012

(86) PCT No.: PCT/CN2012/071576
§ 371 (c)(1),
(2), (4) Date: Aug. 18, 2014

(87) PCT Pub. No.: WO2013/123672
PCT Pub. Date: Aug. 29, 2013

(65) Prior Publication Data
US 2015/0113462 A1    Apr. 23, 2015

(51) Int. Cl.
*G06F 3/0484*    (2013.01)
*G05B 15/02*    (2006.01)
*G06Q 10/06*    (2012.01)

(52) U.S. Cl.
CPC ......... *G06F 3/04842* (2013.01); *G05B 15/02* (2013.01); *G06Q 10/06* (2013.01);
(Continued)

(58) Field of Classification Search
CPC ........ G06F 3/04842; G05B 2219/2642; G05B 2219/32128; G06Q 10/06
See application file for complete search history.

(56) References Cited

U.S. PATENT DOCUMENTS

2007/0282748 A1* 12/2007 Saint Clair ............. H04L 41/06
705/51
2007/0288610 A1* 12/2007 Saint Clair ............. H04L 41/06
709/220

(Continued)

OTHER PUBLICATIONS

Artur Krukowski, et al. Comprehensive Building Information Management System Approach. International Journal of Simulation Systems, Science & Technology, vol. 11, No. 3, pp. 12-28, May 2010.

(Continued)

*Primary Examiner* — Anil Bhargava
(74) *Attorney, Agent, or Firm* — Brooks, Cameron & Huebsch, PLLC

(57) ABSTRACT

Devices, methods, and systems for generating an operational user interface for a building management system are described herein. One method includes generating a widget using geometrical information associated with a building information modeling object and relationship information associated with the building information modeling object, assigning a state variable to the widget by analyzing properties of the building information modeling object or an ontology definition of the building information modeling object, associating the state variable with a point from the building operation system by mapping the point to the state variable, and changing the state variable based on input received from a user.

15 Claims, 3 Drawing Sheets

(52) U.S. Cl.
CPC .............. *G05B 2219/2642* (2013.01); *G05B 2219/32128* (2013.01)

(56) References Cited

U.S. PATENT DOCUMENTS

| | | | |
|---|---|---|---|
| 2009/0271365 A1* | 10/2009 | Chen | G06F 9/4443 |
| 2009/0307255 A1* | 12/2009 | Park | G06Q 10/10 |
| 2010/0281387 A1* | 11/2010 | Holland | G05B 15/02 |
| | | | 715/735 |
| 2010/0324962 A1* | 12/2010 | Nesler | G01R 21/133 |
| | | | 705/7.36 |
| 2011/0087988 A1* | 4/2011 | Ray | G06Q 10/06 |
| | | | 715/771 |
| 2012/0039503 A1* | 2/2012 | Chen | G06T 19/00 |
| | | | 382/100 |
| 2013/0085588 A1 | 4/2013 | Brun et al. | |
| 2013/0300740 A1* | 11/2013 | Snyder | G06F 3/016 |
| | | | 345/420 |

OTHER PUBLICATIONS

Andreas Fernbach, et al. Interoperability at the Management Level of Building Automation Systems: A Case Study for BACnet and OPC UA, IEEE ETFA. pp. 1-8. 2011.

\* cited by examiner

GENERATING AN OPERATIONAL USER INTERFACE FOR A BUILDING MANAGEMENT SYSTEM

TECHNICAL FIELD

The present disclosure relates to devices, methods, and systems for generating an operational user interface for a building management system.

BACKGROUND

A building management system can be used to monitor and/or control a building. For example, the user (e.g., operator) of a building management system can check and/or set the state of a control component(s), equipment, device(s), network (s) area(s), and/or space(s) of the building using the building management system. For instance, if there is a fire in a building, a fire commander can use the building management system to determine where in the building the fire started, and how to prevent the fire from spreading further throughout the building.

A building management system may display a user interface to the operator. The user interface with multiple views can include, for example, the floor plan of the building, with additional information about the building (e.g., information about a device(s) of the building, information about a control network(s) of the building, schematic graphics of the building, etc.) overlaid on the floor plan. The user interface can also include a number of widgets that the operator can use to set and/or update the building information.

In previous building management systems, some or all of the components of the user interface may need to be manually generated (e.g., created and/or built) by the control engineer. For example, the control engineer may have to manually generate the graphics of the building from smaller graphic elements. However, manually generating the user interface of the building management system can be difficult and/or time consuming for the control engineer.

DETAILED DESCRIPTION

Figure 1:
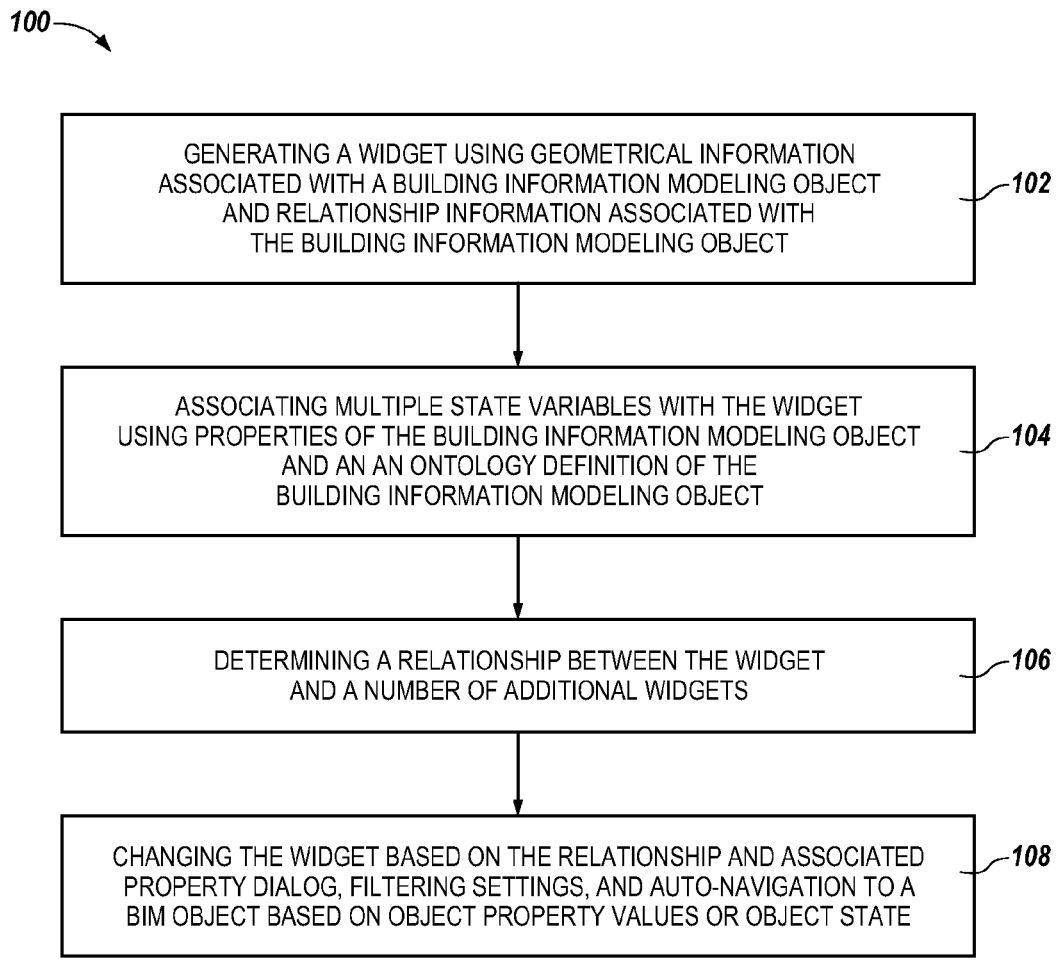
FIG. 1 illustrates a method for generating an operational user interface for a building management system in accordance with one or more embodiments of the present disclosure.

Devices, methods, and systems for generating an operational user interface for a building management system are described herein. For example, one or more embodiments include generating a widget using geometrical information associated with a building information modeling object and relationship information associated with the building information modeling object, assigning a state variable to the widget by analyzing properties of the building information modeling object or an ontology definition of the building information modeling data, associating the state variable with a point from the building operation system by mapping the point to the state variable, and changing the state variable based on input received from a user.

Embodiments of the present disclosure can automatically generate an operational user interface (e.g., a graphical user interface) for a building management system. That is, a user (e.g., control engineer) of a building management system in accordance with embodiments of the present disclosure may not have to manually generate any of the components of the user interface of the building management system. Accordingly, user interfaces of building operations systems in accordance with the present disclosure can be generated easier and/or quicker than user interfaces of building operations systems following previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of widgets" can refer to one or more widgets.

FIG. 1 illustrates a method 100 for generating (e.g., creating and/or building) an operational user interface (e.g., a graphical user interface) for a building management system (e.g., a system used to monitor and/or control a building) in accordance with one or more embodiments of the present disclosure. Method 100 can be performed by a computing device, such as, for example, computing device 330 described in connection with FIG. 3.

At block 102, method 100 includes generating a widget using geometrical information (e.g., data) associated with a building information modeling (BIM) object and relationship information associated with the BIM object. The BIM object can be a representation of, for example, a control component, equipment, device, network, area, and/or space of the building associated with (e.g. used in) building information modeling (e.g., the generation and/or management of data associated with the building). For instance, the BIM object can be a representation of an architectural (e.g., floor plan), mechanical, electrical, plumbing, sanitary, fire, and/or geometrical object (e.g., component, equipment, device, network, area, and/or space) of the building.

The geometrical information associated with the BIM object can include, for example, the shape(s) of the BIM object. For instance, a polygon can be generated for a particular space of the building so that different colors can be set to indicate for different states of the space. As an additional example, a box can be generated to show where a particular device (e.g., a variable air volume damper) is located in the floor plan of the building.

The relationship information associated with the BIM object can include, for example, the industry formation connection (IFC) associated with the BIM object. For instance, a flow arrow can be generated along a duct network of the building according to "device A supplies to device B". As an additional example, the schematic of a chilled water loop of the building can be generated according to the IFC relationship between the components (e.g., chillers, pumps, valves, etc.) of the chilled water loop.

As used herein, a "widget" can be, for example, an element of the user interface that displays an information arrangement that is changeable by a user (e.g., operator) of the user interface such as, for instance, a window or text box. That is, a widget can provide an interaction point for the user to directly manipulate a particular kind(s) of information. For example, the user can use the widget to set and/or update information about the building (e.g., information about a device(s) of the building, information about a control network(s) of the building, schematic graphics of the building, control setpoint state, etc.).

Generating the widget can include generating graphics of the widget. The graphics of the widget can include, for example, a polygon(s), such as, for instance, a polygon for a particular space of the building, with different colors for different states of the space. As an additional example, the graphics of the widget can include an image(s), such as, for instance, an image of a particular device (e.g., pump, valve, etc.) of the building. For instance, a particular device may be indicated by a representational filled wire frame of the device, the mechanical engineering symbol for the device, or an actual picture of devices of that type. As an additional example, the graphics of the widget can include a line(s), such as, for instance, a line for a particular pipe of the building.

The widget can be, for example, a space widget. That is, the widget can be associated with a particular space of the building, such as, for instance, a room in the floor plan of the building. A space widget (e.g., the graphics of the space widget) can be generated by, for example, obtaining three-dimensional geometrical information (e.g., the three-dimensional mesh) associated with the BIM object (e.g., from a BIM database, as will be further described herein), projecting the three-dimensional geometrical information associated with the BIM object into a two-dimensional graph, determining (e.g., finding and/or calculating) the boundary polygons of the two-dimensional graph, rendering the boundary polygons as the graphics of the widget, and forming (e.g., assembling) the graphics into a whole graphic of the widget.

As an additional example, the widget can be a device widget. That is, the widget can be associated with a particular device of the building such as, for instance, a variable air volume (VAV) damper in the air distribution duct network of the building. A device widget can include spatial context (e.g., location information), and can refer to the settings of the device. A device widget (e.g., the graphics of the device widget) can be generated by, for example, inputting semantic information about a state variable (further described herein) into a template. The template can define rules for generating the graphics of the device widget. For example, the template can define a setpoint as an edit box, present the value as a label, or Boolean value as a radio button, among other rules. The rules defined by the template can be applied to the inputted semantic information to generate the device widget.

As an additional example, the widget (e.g., the schematic graphical user interface) can represent the logical relationship among devices of the building. For instance, for a chiller system that includes chillers, valves, and pumps, the widget can represent the relationship the chillers, valves, and pumps as pipes connecting them. Such a logical relationship can be generated by, for example, retrieving an air distribution loop from the relationship information associated with the BIM object, obtaining three-dimensional geometrical information associated with the BIM object (e.g., from a BIM database, as will be further described herein), rendering the air distribution system and the three-dimensional geometrical information as graphics of the widget, and forming the graphics into a whole graphic of the widget.

In some embodiments, the widget can be generated automatically. That is, the widget does not have to be manually generated by the user of the user interface (e.g., the widget can be generated without any input from the user).

At block 104, method 100 includes associating multiple state variables with (e.g., attaching and/or binding the state variables to) the widget using (e.g., by analyzing) properties of the BIM object and an ontology definition (e.g., naming convention, attributes, and relationships) of the BIM object. For instance, a state variable can be assigned to the widget by analyzing properties of the BIM object or other meta-data definition, such as the ontology definition of the BIM object, and the state variable can be associated with a point from (e.g., a control setpoint of) the building operation system by mapping the point to the state variable. An ontology defines, at a minimum, the name of a class or concept, the properties or attributes of the class, and its relations with other classes. The relationships may also have properties.

For example, a name can be assigned to the widget based on the IFC class associated with the BIM object, a BIM database (e.g., BIM database 226 described in connection with FIG. 2) can be searched for all BIM data (further described herein) associated with the assigned name, the BIM data associated with the assigned name can be retrieved from the BIM database, the retrieved BIM data can be parsed based on the ontology definition of the BIM object, the parsed BIM data can be assigned as the state variable, and the assigned state variable can be attached to the widget.

The state variable can be associated with a control setpoint of the building management system. For example, the state variable can include semantic data (e.g., type, unit, present value, setpoint value, manual override value, etc.) associated with the control point. Accordingly, a change to the control setpoint may result in a corresponding change (e.g., update) to the state variable. For example, the color of a displayed VAV damper may change to red if the supplied air temperature rises above a particular threshold. The state variable may also be changed by the user of the user interface, as will be further described herein.

The state variable can control the appearance and/or behavior of the widget. For example, a change in the state variable can result in a change to the appearance and/or behavior of the widget. Further, the graphics of the widget can be based on the behavior of the widget. Accordingly, a change to the state variable can result in a change to the graphics of the widget, since the state variable controls the behavior of the widget. For example, if a state variable associated with a space of the building changes, the color of the space may also change.

In some embodiments, the state variable can be associated with (e.g., assigned to) the widget automatically. That is, the state variable does not have to be manually associated with the widget by the user of the user interface (e.g., the state variable can be associated with the widget without any input from the user).

At block 106, method 100 includes determining (e.g., maintaining and/or abstracting) a relationship between the widget and a number of additional widgets. The relationship between the widgets can include, for example, which VAV serves which building space, or which device supplies which other device.

The relationship between the widgets can be determined by, for example, searching the relationship information associated with the BIM objects of the widgets, and traversing the BIM objects of the widgets. For example, the IFC class relationship of the BIM objects (e.g., HVAC devices) can be searched to find the diffusers connected to each VAV. The BIM objects of a space in the building can then be traversed to find the diffusers contained in the space.

At block 108, method 100 includes changing the widget (e.g., refining the graphics of the widget) based on the relationship. As illustrated in FIG. 1, the widget can also be changed based on associated property dialog, filtering settings, and auto-navigation to a BIM object based on object property values or object state. For example, a VAV can be highlighted, and then any downstream devices of the VAV, up to a diffuser and/or the spaces of the building served by the diffuser, can also be highlighted.

Figure 2:
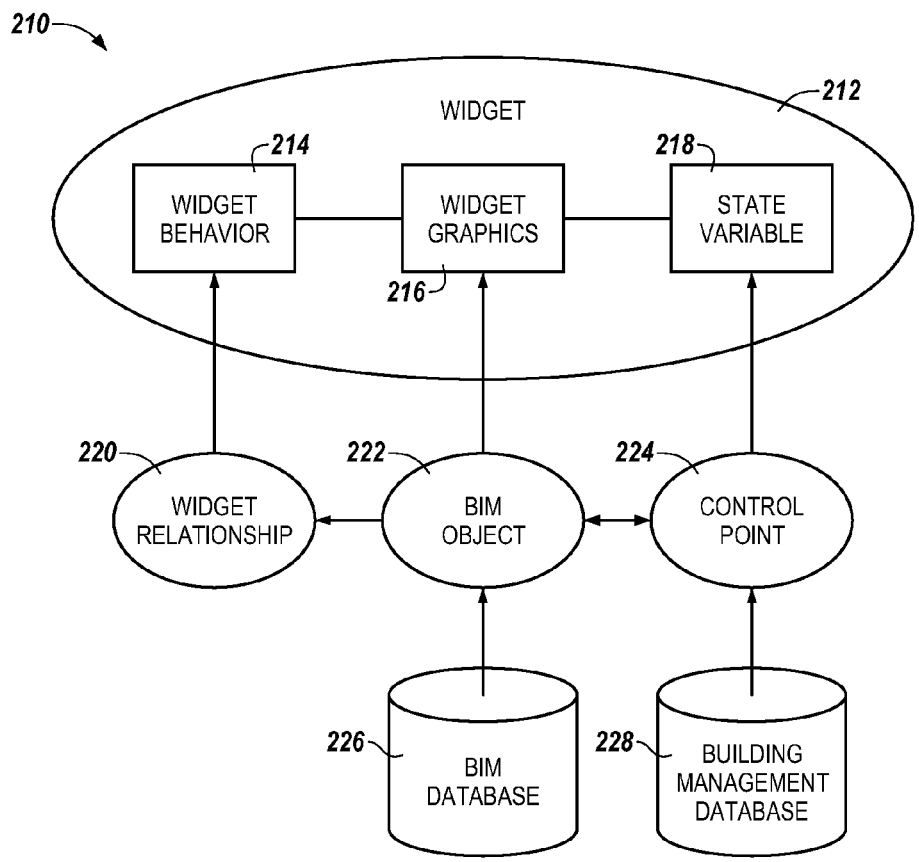
FIG. 2 illustrates a system for generating an operational user interface for a building management system in accordance with one or more embodiments of the present disclosure.

FIG. 2 illustrates a system 210 for generating an operational user interface for a building management system in accordance with one or more embodiments of the present disclosure. As shown in FIG. 2, system 210 includes a widget 212. Widget 212 can be, for example, a space widget, a device widget, or represent the logical relationship among devices of the building, as previously described in connection with FIG. 1.

Widget 212 can be generated using geometrical information and relationship information associated with a BIM object 222, in a manner analogous to that previously described in connection with FIG. 1. For example, widget 212 can be generated automatically, as previously described in connection with FIG. 1. BIM object 222 can be a representation of a control component, equipment, device, network, area, and/or space of the building associated with the building information modeling, the geometrical information associated with BIM object 222 can include the shape(s) of BIM object 222, and the relationship information associated with BIM object 222 can include the IFC associated with BIM object 222, as previously described in connection with FIG. 1.

BIM object 222, the geometrical information associated with BIM object 222, and/or the relationship information associated with BIM object 222 can be retrieved (e.g., extracted) from a BIM database (e.g., BIM database 226), as illustrated in FIG. 2. BIM database 226 can include (e.g., store) BIM data associated with a number of buildings. Such BIM data can include, for example, data associated with the objects (e.g., control components, equipment, devices, networks, areas, and/or spaces) of the buildings. For instance, the BIM data can include architectural, structural, mechanical, electrical, plumbing, lighting, fire, and/or geometrical information associated with the buildings.

As shown in FIG. 2, widget 212 can include graphics 216. Graphics 216 can include, for example, a polygon(s), an image(s), and/or a line(s) associated with BIM object 222, in a manner analogous to that previously described in connection with FIG. 1.

As shown in FIG. 2, a state variable 218 can be associated with widget 212. State variable 218 can be associated with widget 212 using properties of BIM object 222 and an ontology definition of BIM object 222, in a manner analogous to that previously described in connection with FIG. 1. For example, state variable 218 can be associated with widget 212 automatically, as previously described in connection with FIG. 1.

State variable 218 can be associated with a control setpoint 224 of the building management system. For example, state variable 218 can include semantic data associated with control setpoint 224, as previously described in connection with FIG. 1. Control setpoint 224 (e.g., the semantic data associated with control setpoint 224) can be retrieved from an operations database of the building (e.g., building management database 228), as illustrated in FIG. 2.

As previously described in connection with FIG. 1, a change to control setpoint 224 may result in a corresponding change to state variable 218. State variable 218 may also be changed by a user on the user interface, as will be further described herein.

State variable 218 can control the behavior 214 of widget 212. For example, a change in state variable 218 can result in a change to the behavior 214 of widget 212. Further, the graphics 216 of widget 212 can be based on the behavior 214 of widget 212. Accordingly, a change to state variable 218 can result in a change to the graphics 216 of widget 212, as previously described in connection with FIG. 1.

As illustrated in FIG. 2, widget 212 can have a relationship 220 with an additional widget (not shown in FIG. 2). The relationship 220 between the widgets can be analogous to the relationship previously described in connection with FIG. 1, and can be determined in a manner analogous to that previously described in connection with FIG. 1. Widget 212 can change based on the relationship 220, as previously described in connection with FIG. 1.

Figure 3:
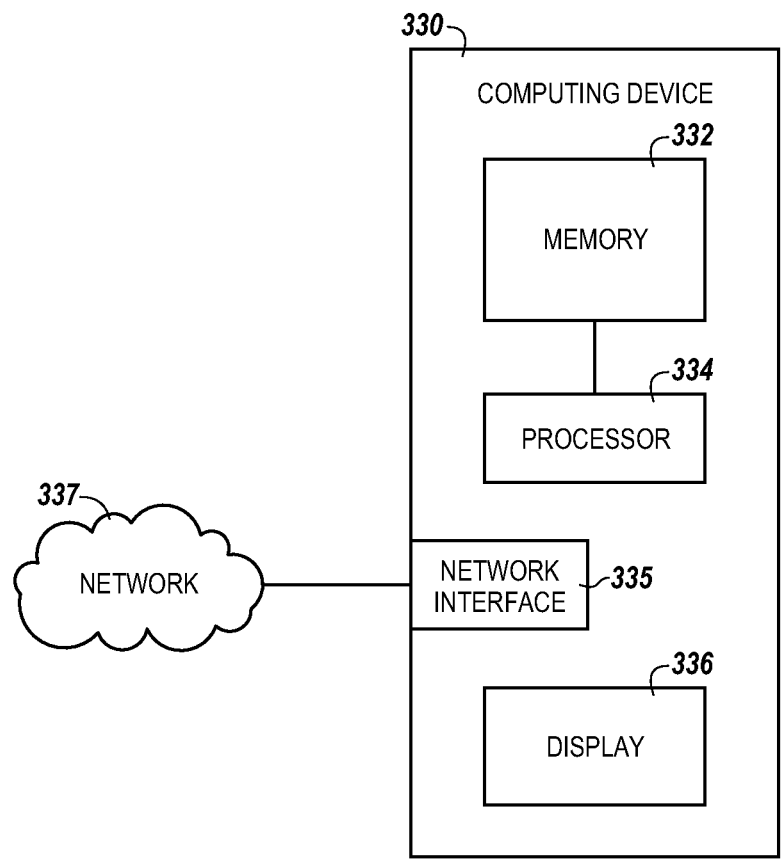
FIG. 3 illustrates a computing device for generating an operational user interface for a building management system in accordance with one or more embodiments of the present disclosure.

FIG. 3 illustrates a computing device 330 for generating an operational user interface for a building management system in accordance with one or more embodiments of the present disclosure. Computing device 330 can be, for example, a laptop computer, a desktop computer, or a mobile device (e.g., a mobile phone, a personal digital assistant, etc.), among other types of computing devices.

As shown in FIG. 3, computing device 330 can include a memory 332 and a processor 334 coupled to memory 332. Memory 332 can be any type of storage medium that can be accessed by processor 334 to perform various examples of the present disclosure. For example, memory 332 can be a non-transitory computer readable medium having computer readable instructions (e.g., computer program instructions) stored thereon that are executable by processor 334 to perform various examples of the present disclosure.

Memory 332 can be volatile or nonvolatile memory. Memory 332 can also be removable (e.g., portable) memory, or non-removable (e.g., internal) memory. For example, memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 332 is illustrated as being located in computing device 330, embodiments of the present disclosure are not so limited. For example, memory 332 can also be located internal to another computing resource (e.g., enabling computer readable instructions to be downloaded over the Internet or another wired or wireless connection).

As shown in FIG. 3, computing device 330 includes a network interface 335. Network interface 335 can connect computing device to a network, such as network 337 illustrated in FIG. 3. Network 337 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 337) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 337 can tie a number of computing devices together to form a distributed control network (e.g., permit a mobile device to connect to a server that connects with a building management system).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 3, computing device 330 also includes a display 336. Display 336 can include, for example, a screen that can provide (e.g., display and/or present) information to a user of computing device 330. For instance, display 336 can provide a widget generated in accordance with one or more embodiments of the present disclosure, and a state variable associated with the widget in accordance with one or more embodiments of the present disclosure, to a user of computing device 330.

Additionally, computing device 330 can receive information from the user of computing device 330 through an interaction with the user via display 336. For example, computing device 330 can receive input from the user via display 336. The user can enter the input into computing device 330 using, for instance, a mouse and/or keyboard associated with computing device 330 (e.g., display 336).

As an example, the input received by computing device 330 via display 336 can include a change to the control setpoint of the building management system. That is, the user can change the control setpoint of the building management system via display 336. The state variable can change based on the change to the control setpoint of the building management system input by the user, as previously described herein.

Although some embodiments of the present disclosure have been described in connection with IFC, the leading public standard BIM representation, embodiments of the present disclosure are not limited to processing or producing IFC-based information. For example, embodiments of the present disclosure can be applied to BIM models produced by other commercial applications, or serialized in other formats.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for generating an operational user interface for a building management system, comprising:
    generating a widget using geometrical information associated with a building information modeling object and relationship information associated with the building information modeling object, wherein generating the widget includes:
        retrieving an air distribution loop system from the relationship information associated with the building information modeling object;
        obtaining three-dimensional geometrical information associated with the building information modeling object;
        rendering the air distribution loop system and the three-dimensional geometrical information as graphics of the widget; and
        forming the graphics into a whole graphic of the widget;
    assigning a state variable to the widget by analyzing properties of the building information modeling object and an ontology definition of the building information modeling object, wherein the ontology definition of the building information modeling object includes a naming convention of a class associated with the building information modeling object;
    associating the state variable with a point from the building operation system by mapping the point to the state variable; and
    changing the state variable based on input received from a user.

2. The method of claim 1, wherein the method includes:
    determining a relationship between the widget and an additional widget; and
    changing the widget based on the relationship.

3. The method of claim 1, wherein the method includes:
    automatically generating the widget; and
    automatically assigning the state variable to the widget.

4. The method of claim 1, wherein the state variable controls an appearance and behavior of the widget.

5. The method of claim 1, wherein the point is a control setpoint of the building management system.

6. The method of claim 5, wherein the method includes changing the state variable based on a change to the control setpoint.

7. The method of claim 1, wherein the method includes changing the graphics of the widget based on behavior of the widget.

8. The method of claim 1, wherein the widget is a space widget or a device widget.

9. The method of claim 1, wherein the widget represents a logical relationship among devices of the building.

10. A computing device for generating an operational user interface for a building management system, comprising:
a memory;
a network interface configured to connect the computing device to a network;
a processor configured to execute executable instructions stored in the memory to:
generate a widget using geometrical information associated with a building information modeling object and relationship information associated with the building information modeling object, wherein the processor is configured to execute the executable instructions to generate the widget by:
retrieving an air distribution loop system from the relationship information associated with the building information modeling object;
obtaining three-dimensional geometrical information associated with the building information modeling object;
rendering the air distribution loop system and the three-dimensional geometrical information as graphics of the widget; and
forming the graphics into a whole graphic of the widget;
assign a state variable to the widget by analyzing properties of the building information modeling object and an ontology definition of the building information modeling object, wherein the ontology definition of the building information modeling object includes a naming convention of a class associated with the building information modeling object; and
associate the state variable with a point from the building operation system by mapping the point to the state variable; and
a display configured to provide the widget and the state variable associated with the widget to a user of the computing device.

11. The computing device of claim 10, wherein the processor is configured to execute the executable instructions to generate the widget by:
inputting semantic information of the state variable into a template, wherein the template defines rules for generating graphics of the widget; and
applying the rules defined by the template to the inputted semantic information.

12. The computing device of claim 10, wherein the processor is configured to execute the executable instructions to change the state variable based on input received from the user.

13. A non-transitory computer readable medium having computer readable instructions stored thereon that are executable by a processor to:
generate a widget using geometrical information associated with a building information modeling object and relationship information associated with the building information modeling object;
associate multiple state variables with the widget using properties of the building information modeling object and an ontology definition of the building information modeling object, wherein the ontology definition of the building information modeling object includes a naming convention of a class associated with the building information modeling object;
assign a name to the widget;
retrieve, from a building information modeling database, all building information modeling data associated with the assigned name;
parse the retrieved building information modeling data based on the ontology definition of the building information modeling object;
assign the parsed building information modeling data as the state variables;
attach the state variables to the widget;
determine a relationship between the widget and a number of additional widgets; and
change the widget based on the relationship.

14. The non-transitory computer readable medium of claim 13, wherein the state variables include semantic data.

15. The non-transitory computer readable medium of claim 13, wherein the computer readable instructions are executable by the processor to determine the relationship between the widget and the number of additional widgets by:
searching the relationship information associated with the building information modeling object of the widget and relationship information associated with building information modeling objects of the number of additional widgets; and
traversing the building information modeling object of the widget and the building information modeling objects of the number of additional widgets.

* * * * *